United States Patent
Gelman et al.

(10) Patent No.: US 12,289,230 B1
(45) Date of Patent: Apr. 29, 2025

(54) COMMUNICATION NETWORK CONFIGURATION

(71) Applicant: ECI Telecom Ltd., Petah Tikva (IL)

(72) Inventors: Efraim Gelman, Ramat Gan (IL); Hayim Porat, Rishon LeTsyion (IL); Inbal Hecht, Petah Tikva (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 18/630,136

(22) Filed: Apr. 9, 2024

Related U.S. Application Data

(63) Continuation of application No. 18/324,854, filed on May 26, 2023.

(51) Int. Cl.
*H04L 45/00* (2022.01)
*H04L 45/24* (2022.01)

(52) U.S. Cl.
CPC .............. *H04L 45/14* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 6,816,585 B1* | 11/2004 | Blatt | H04L 45/122 379/272 |
| 9,560,531 B1* | 1/2017 | Chang | H04W 52/18 |
| 11,108,873 B1* | 8/2021 | Ezra | H04L 45/28 |
| 11,671,323 B1* | 6/2023 | Porat | H04L 41/084 709/220 |
| 11,888,723 B1* | 1/2024 | Hecht | H04L 41/22 |
| 11,901,936 B1* | 2/2024 | Hecht | H04B 10/27 |
| 2005/0063309 A1* | 3/2005 | Alicherry | H04L 45/18 370/238 |
| 2006/0002291 A1* | 1/2006 | Alicherry | H04L 45/00 370/225 |
| 2016/0380873 A1* | 12/2016 | Kanonakis | H04Q 3/64 370/254 |
| 2022/0231938 A1* | 7/2022 | Jain | H04L 45/02 |

* cited by examiner

*Primary Examiner* — Kenny S Lin
(74) *Attorney, Agent, or Firm* — Finnegan, Henderson, Farabow, Garrett & Dunner LLP

(57) ABSTRACT

Headend nodes on a communication network can be configured to recover from a change of network conditions by generating new paths for demands. A headend node can generate paths both for demand(s) managed by the headend and other demand(s) managed by other headend(s). The headend nodes can be initialized with the same network representation and can deterministically identify paths, such that each headend identifies the same path for the same demand. The headend nodes can provide configuration instructions for the demands that they manage, but can provide them according to a deterministic schedule, to avoid conflicts.

20 Claims, 7 Drawing Sheets of the demands. The configuring can include providing configuration instructions to configure the communication network to satisfy a first demand of the first subset using a first route. The first route can implement a first path of the determined paths. The first path can correspond to the first demand. The provision of the configuration instructions can be delayed until a completion condition based on the deterministic ordering is satisfied.

COMMUNICATION NETWORK CONFIGURATION

CROSS-REFERENCE TO RELATED APPLICATIONS

This application is a continuation of application Ser. No. 18/324,854, filed May 26, 2023. The patent application identified above is incorporated here by reference in its entirety to provide continuity of disclosure.

TECHNICAL FIELD

The present disclosure relates to the field of communication networks and, more particularly, to systems and methods for determining routes on communication networks.

BACKGROUND

An optical communication network can be configured to satisfy demands. Such demands can include requests to communicate (or establish a communication channel, or the like) between a source node and a target node in the network. A demand can be satisfied using a route through the communication network. The route can be implemented using hardware resources (e.g., transceivers, or the like) or software resources (e.g., compute, memory, or the like) of the communication network. A headend node can be configured to manage each demand. The headend node can be responsible for identifying and configuring the route. The headend node can also be responsible for identifying and configuring a new route, if necessary.

In response to a change in network conditions, multiple headend nodes may independently and contemporaneously begin searching for new routes for demands. However, new routes independently determined by different headend nodes may attempt to use the same hardware or software resources, resulting in conflicts. Such conflicts may substantially delay the recovery of the communication network to a change in network conditions.

SUMMARY

Systems and methods are disclosed for generating new routes in a distributed manner. Headend nodes on a communication network can be configured to deterministically generate new routes for demands. The headend nodes can provide configuration instructions for the demands that they manage, but can provide them according to a deterministic schedule, to avoid conflicts.

The disclosed embodiments include a headend node. The headend node can include at least one processor and at least one computer readable medium containing instructions. When executed by the at least one processor, the instructions can cause the headend node to perform operations. The operations can include obtaining network information for a communication network. The network information can specify a network graph representing the communication network and demands on the communication network. The demands can include a first subset of the demands managed by the headend node and a second subset of the demands managed by other headend nodes. The operations can include, in response to satisfaction of a trigger condition, determining paths on the network graph using a deterministic path-finding method, the determined paths corresponding to the demands and having a deterministic ordering, and configuring the communication network to satisfy the first subset of the demands. The configuring can include providing configuration instructions to configure the communication network to satisfy a first demand of the first subset using a first route. The first route can implement a first path of the determined paths. The first path can correspond to the first demand. The provision of the configuration instructions can be delayed until a completion condition based on the deterministic ordering is satisfied.

The disclosed embodiments include a communication system. The communication system can include nodes connected by communication links. The nodes can include headend nodes responsible for managing demands on a communication network. Each headend node can be configured to perform, in response to satisfaction of a trigger condition, operations. The operations can include determining paths on the network graph using a deterministic path-finding method, the determined paths corresponding to the demands and having a deterministic ordering, the demands including a first subset of demands managed by the headend and a second subset of demands managed by other headend nodes. The operations can further include providing configuration instructions to configure the communication network to satisfy the first subset of demands using routes that implement a corresponding subset of the determined paths. The provision of the configuration instructions to configure the communication network to satisfy a first demand in the first subset can be delayed until a completion condition associated with the first demand in the first subset is satisfied.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
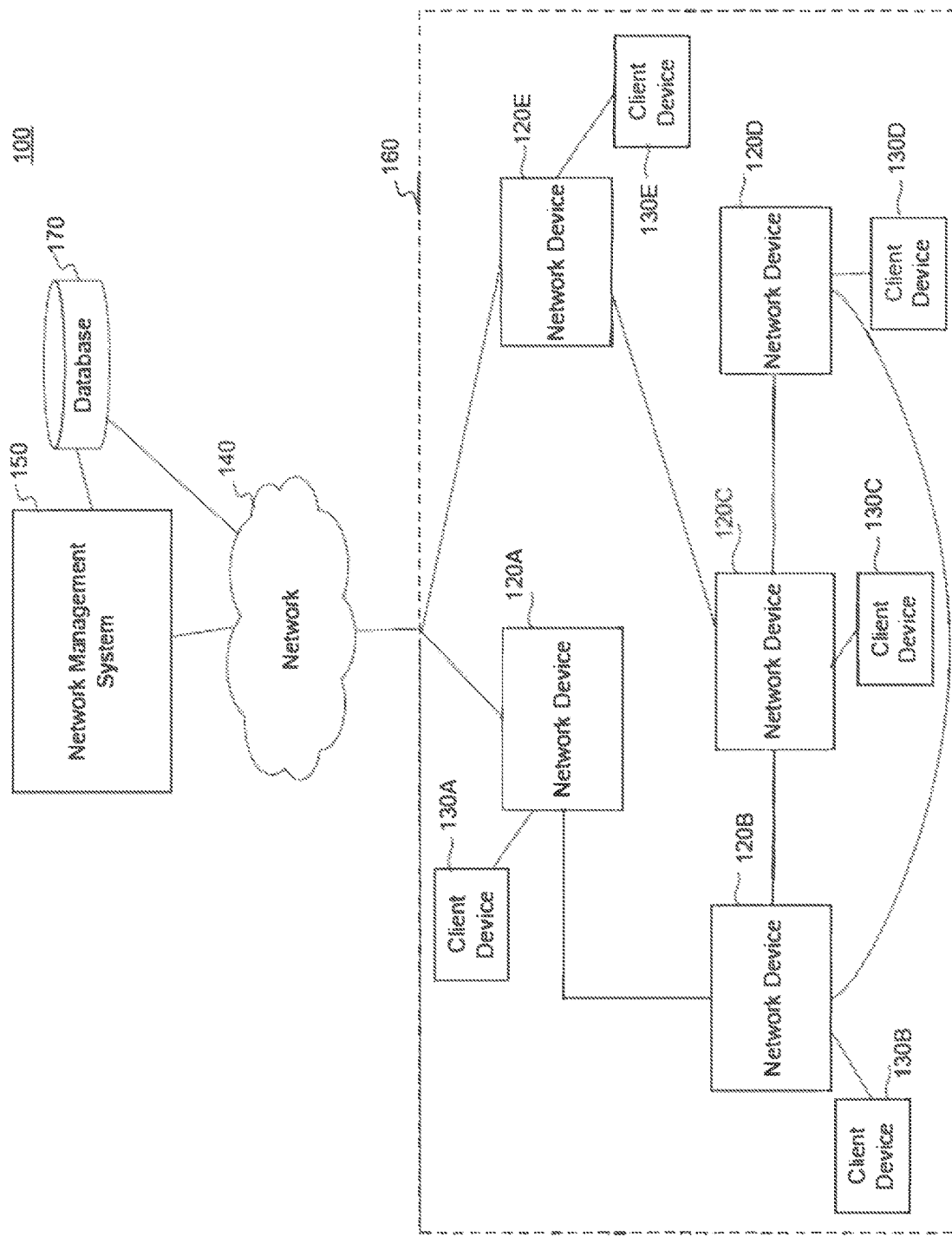
FIG. 1 depicts an exemplary communication system, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The disclosed embodiments can be performed using a graph representing the communication network. The graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Multiple potential routes can exist between a source node and target node on the communication network. When a communication link used to service a demand fails, the demand can be re-routed along another route from the source node to the target node.

A headend node (also referred to as a "headend") can be a node responsible for managing one or more demands on the communication network. For convenience of description, the term headend can also refer to a vertex on a graph representing the communication network that corresponds to a headend node. The headend node can provide instructions to other nodes, configuring these nodes to provide a route through the communication network for the demand(s). The disclosed embodiments are not limited to any particular implementation of such configuration. In some embodiments, the instructions can configure a target node with a forwarding entry associated with the demand. In some embodiments, the instructions can configure intermediate nodes along the route with forwarding entries associated with the demand. In some embodiments, the instructions can configure the intermediate and destination nodes to reserve communication capacity (e.g., bandwidth, or the like) for servicing the demand. The disclosed embodiments are not limited to any particular implementation of such communication capacity reservation. In some dense wavelength-division multiplexing (DWDM) embodiments, for example, reserved communication capacity can be specified in terms of spectrum and central frequency.

As part of managing a demand, a headend node may be responsible for determining a new path for the demand. In some embodiments, the headend node can be configured to determine a new path for the demand when the existing route satisfying the demand becomes unavailable. In some embodiments, the headend node can be configured to determine a new path for the demand in response to an indication that additional resources have become available. In some embodiments, the headend node can be configured to determine a new path for the demand in response to an instruction to improve the route (e.g., determine a shorter route, release capacity in a bottleneck, or improve the usage of resources in satisfying the demands on the communication network). The disclosed embodiments are not limited to any particular scenario under which the existing route becomes unavailable. In some instances, a change in the communication network (e.g., addition, removal, or modification of a demand; addition, restoration, or failure of a node or communication link of the communication network; or the like) may cause the existing route to become unavailable.

In some instances, multiple headend nodes may contemporaneously attempt to generate new routes for affected demands. Unfortunately, these routes can conflict. For example, two different headend nodes can assign the same frequency slot in a communication link to two different routes. As an additional example, two different headend nodes can assign two different routes to the same communication link. The communication link may have sufficient capacity to support either of the routes, but not both routes.

Conflicts between new routes can delay the recovery of the communication network. A first headend may calculate a first route for a demand, provide instructions to other nodes to implement the first route, and then receive a message from one of the nodes that the first route cannot be implemented. In some implementations, the first headend may then send additional messages to the other nodes cancelling implementation of the first route. This process can impose a substantial time delay on the establishment of a new route for the demand. Furthermore, there is no guarantee that the next route the first headend calculates will be conflict-free. Additionally, a second headend may attempt to use resources (e.g., communications links, transceivers, frequency slots, etc.) reserved for the first route between when those resources are reserved by the first headend and when those resources are released by the first headend. The second headend may be blocked from using those resources, even when the resources are not—ultimately—used to implement the first route.

The disclosed embodiments provide a distributed process for determining new paths. In some embodiments, each headend can be initialized with the same network information. This network information can specify all the demands on the network. Each headend can also be configured with rules or instructions for deterministically identifying routes for each demand on the network. In a first phase, in response to satisfaction of a trigger condition, a headend can deterministically identify routes for each demand on the network (or a deterministic subset of the demands on the network, such as the subset of demands affected by the change in network conditions). The order in which the routes are identified can be deterministic, dependent on the network information and the rules or instructions for deterministically identifying routes. In a second phase, each headend can provide configuration instructions to other nodes in the communication network in the deterministic order. While a headend may determine routes for all demands, the headend may only provide configuration instructions concerning demands managed by that headend.

As may be appreciated, to reduce service interruptions, all resources used by all prior routes may not be released prior configuring the communication network to use the new routes. Instead, as a new route is configured for a demand, the resources used by the previous route for that demand (if any) can be released. For example, the resources used by the old route can be released before, during, or after configuration of the new route. As a result, the sequence in which the network is configured with new routes matters. If the network is configured in a different order than the order in which the new routes were determined, the necessary resources may not yet have been released, resulting in conflicts. Accordingly, the headend may schedule provision of the configuration instructions for a demand based on the order of the demand in the deterministic order.

Consistent with disclosed embodiments, performance of the distributed process may be independent of the number of headend nodes affected by a change in the communication network. The envisioned embodiments can therefore address both routes managed by a single headend and routes managed by many headend nodes. Furthermore, consistent with disclosed embodiments, a headend can determine routes independent of any routing information received from other headend nodes. In some embodiments, a headend need not provide routing information to other headend nodes. Such embodiments therefore need not accommodate the delay and complexity arising from a requirement that headend nodes provide routing information to other headend nodes, receive routing information from other headend nodes, or exchange routing information with other headend nodes. Accordingly, disclosed embodiments can provide more-scalable, simpler, and faster, alternatives to conventional processes for determining new paths following a change in a communication network. Accordingly, the disclosed embodiments amount to improvements in communications networking.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands on communication network 160 (e.g., by determining routing and wavelength assignment for a given set of demands). Furthermore, as described herein, network management system 150 may repackage demands to improve the efficiency and capacity of communication network 160.

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 can be an electronic network. Nodes 120 can be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120, the demands and corresponding configurations (e.g., routes or the like) provided by the communication network 160, and so on. Database 170 may also be adapted to store information associated with the network topology and demands in the communication network 160, so as to facilitate efficient route configurations and resource allocations to satisfy the demands in the communication network 160. The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first central frequency and first spectral width can together define a first "frequency slot", while the second central frequency and second spectral width can together define a second "frequency slot." The first and second signals can be non-overlapping in the frequency spectrum. In some embodiments, the WDM physical layer can be or support an elastic optical network (e.g., a "Flexgrid" network or the like). Without departing from envisioned embodiments, the disclosed embodiments may be implemented using central frequencies and frequency slot widths demarcated in Hz (e.g., integer multiples of 6.25 GHz, 12.5 GHZ, or other base values; arbitrary spectrum bands defined by central frequencies and bandwidths; or other suitable schema).

Figure 2:
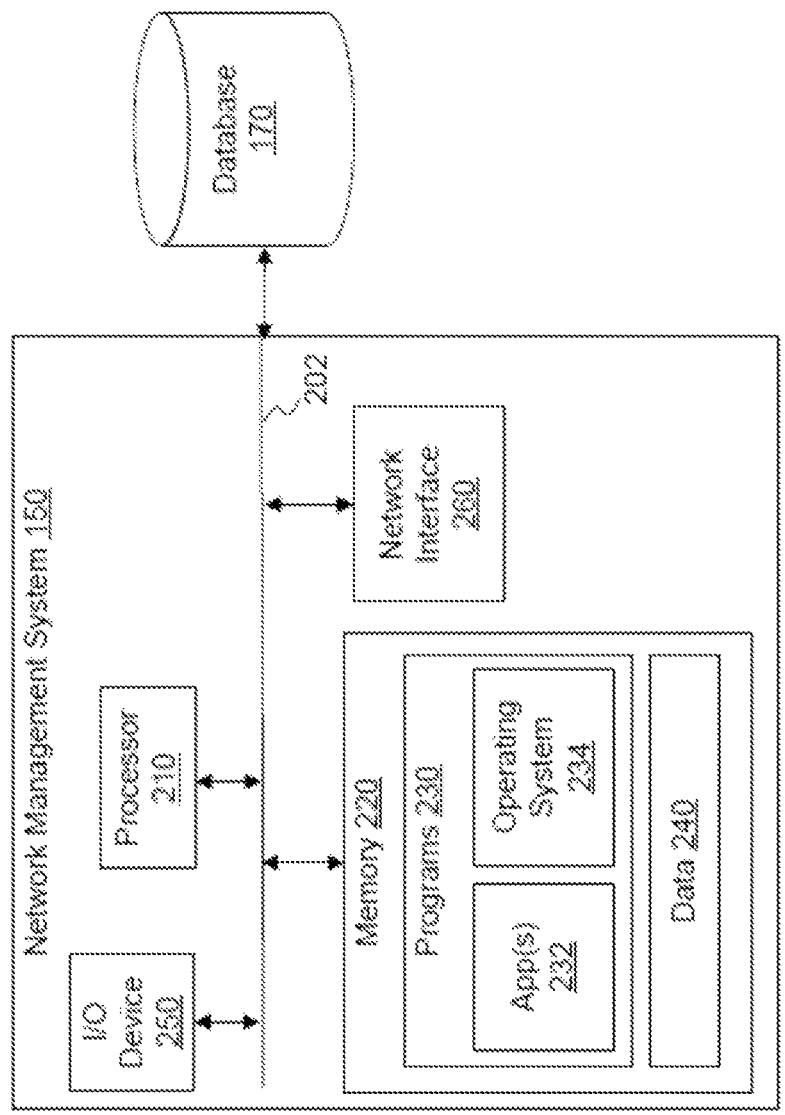
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands. The one or more of nodes 120 can be configured to satisfy one or more demands using routes on the communication network. The routes can correspond to determined paths on a network graph that corresponds to the communication network.

Consistent with disclosed embodiments, a node configured as a headend can be configured to determine paths over a network graph for demands. In some embodiments, the node can configure (e.g., by providing instructions to other nodes) the communication network corresponding to the network graph to satisfy the demands (or a subset of the demands managed by the headend, or a subset of the demands managed by the headend and affected by a change in network conditions, or the like) using routes corresponding to the paths.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes, allocate resources for services to be delivered in communication network 160, and provide instructions to other components of a communication system (e.g., nodes 120 of communication system 100, or the like) as disclosed herein.

In some embodiments, program(s) 230 may include operating system 234 performing operating system functions when executed by one or more processors such as processor 210. By way of example, operating system 234 may include Microsoft Windows™, Unix™, Linux™ Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160. The data 240 may also specify transceiver types or transceiver properties (e.g., spectrum width (s), length or Optical Signal to Noise Ratio bounds, capacity, or cost). For example, a transceiver type may indicate the ability to store up to v units of data and transmit this data up to a range l by occupying a frequency slot of width w.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3:
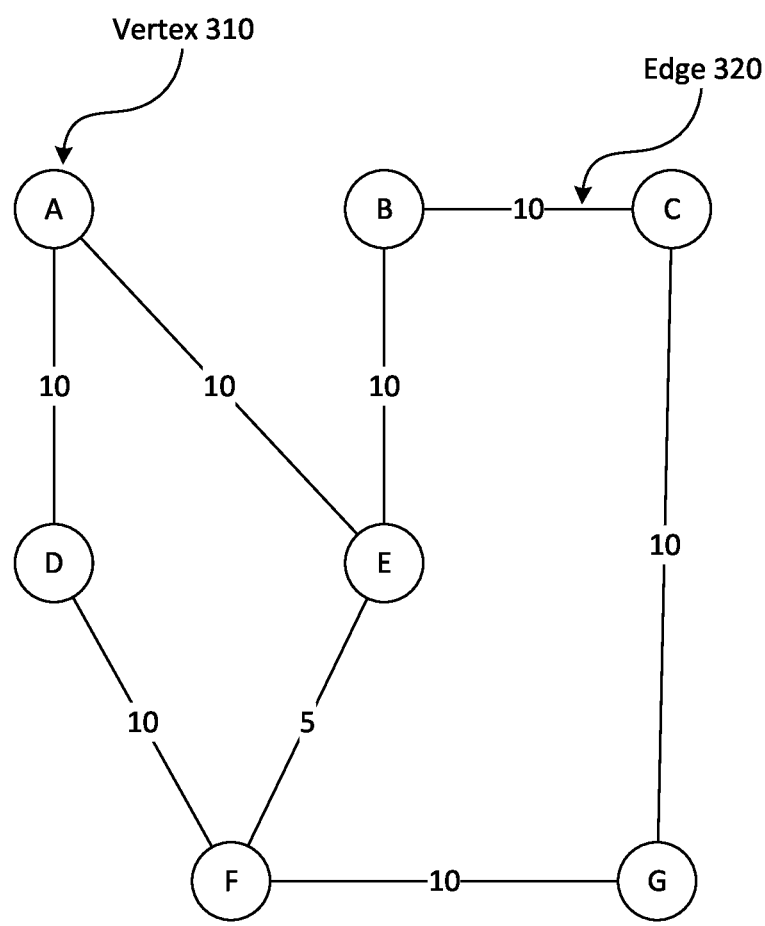
FIG. 3 depicts an exemplary collision between routes on a network graph, consistent with disclosed embodiments.

FIG. 3 depicts an exemplary collision between new routes on a network graph 300, consistent with disclosed embodiments. In practice, network graph 300 can correspond to a communication network (e.g., such as communication network 160, or the like). Vertices of network graph 300, such as vertex 310, can correspond to nodes (or sub-networks including multiple nodes) of the communication network. Edges of network graph 300, such as edge 320, can correspond to communication links (or sub-networks including multiple communication links) of the communication network.

In this example, there are two demands on network graph 300. Demand $d_1$ has a source vertex A and a terminal vertex F. Demand $d_2$ has a source vertex B and a terminal vertex F. Vertex A can serve as the headend for demand $d_1$, while vertex B can serve as the headend for demand $d_2$. Edge $e_{ef}$ connects node E and node F and can accommodate $d_1$ or $d_2$, but not both.

In response to some change in communication network 300, headend A and headend B may independently determine new routes for demand $d_1$ and demand $d_2$, respectively. As depicted herein, each edge is associated with a score. In this example, a total score for a new path can be the sum of the scores for the edges included in the new path.

In some conventional approaches, each headend can be configured to determine a new path for the demands managed by that headend. The headend can select a new path that minimizes the total score for that new path. In this example, headend A can select the new path $p_1=\{e_{ae}, e_{ef}\}$, because that path connects source vertex A with terminal vertex F and has a total score of 15, less than the total score of alternative paths that connect source vertex A with terminal vertex F. Headend B can select $p_2=\{e_{be}, e_{ef}\}$, because that path connects source vertex B with terminal vertex F and has a total score of 15, less than the total score of alternative paths that connect source vertex B with terminal vertex F. However, in this example, the communication link corresponding to edge $e_{ef}$ cannot accommodate both $d_1$ and $d_2$. Therefore, when the nodes corresponding to vertices A and B attempt to configure the communication network to implement routes corresponding to $p_1$ and $p_2$, a conflict results. Resolving this conflict can take time and resources.

Consistent with disclosed embodiments, headend A and headend B can determine routes for both demands $d_1$ and $d_2$. As described herein, both headend A and headend B can determine these routes using the same deterministic rules and instructions. Furthermore, both headend A and headend B can determine these routes using the same network graph. As a result, headend A and headend B can both determine that demand $d_1$ should be satisfied using path $p_4$, while demand $d_2$ is satisfied using path $p_2$. Headend A can then provide instructions to configure the communication network to implement path $p_4$, while headend B can provide instructions to configure the communication network to implement path $p_2$. As a result, no conflicts occur.

Figure 4:
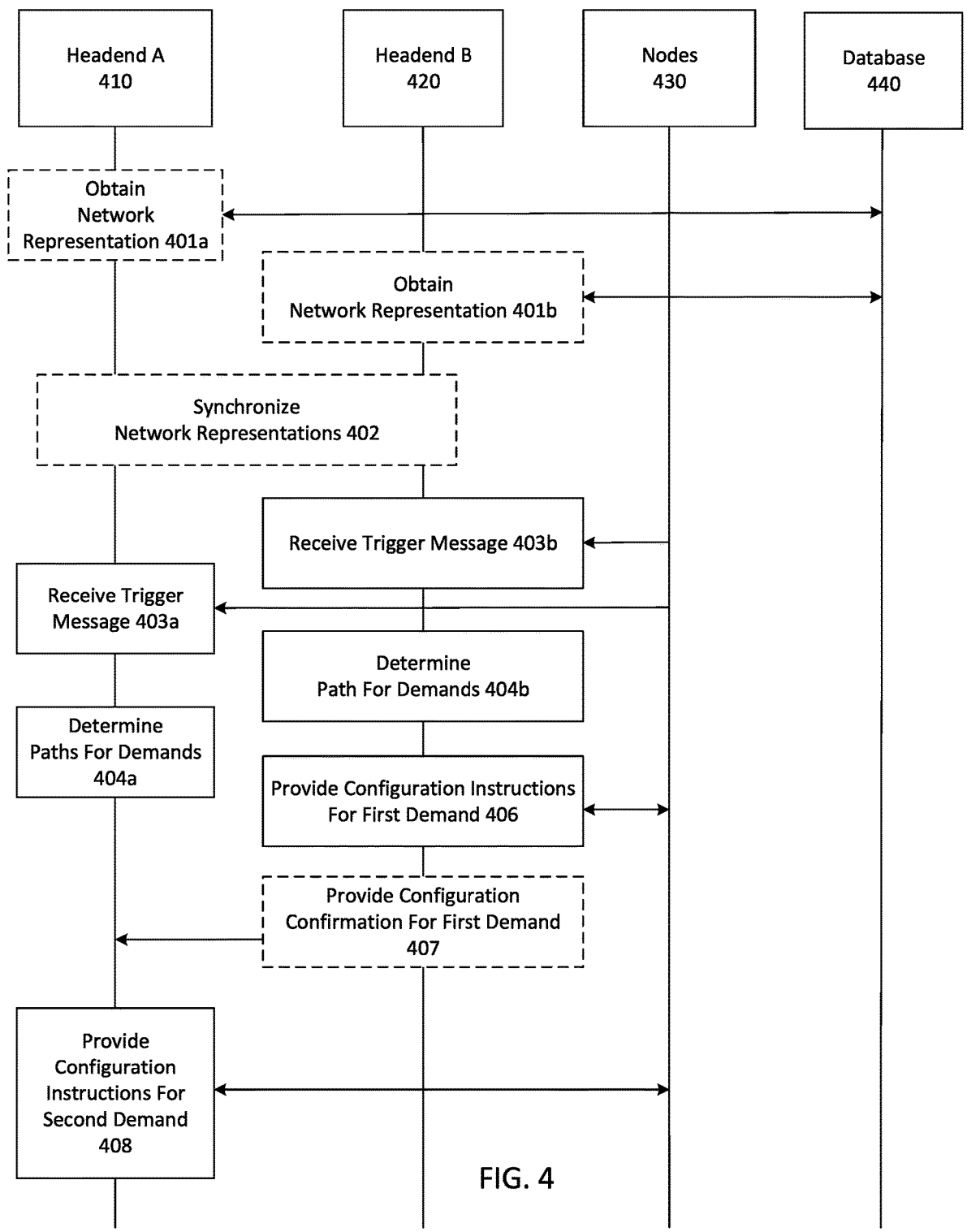
FIG. 4 depicts a process for configuring a communication network using nodes in the communication network, consistent with disclosed embodiments.

FIG. 4 depicts a process 400 for configuring a communication network (e.g., communication network 160, or the like), using nodes in the communication network (e.g., ones of nodes 120, or the like). The nodes include two headend nodes (e.g., headend A and headend B) responsible for managing demands on the communication network and additional nodes 430 that comprise the communication network. In this example, the demands can include a first demand $d_1$, managed by headend 410, and a second demand $d_2$, managed by headend 420.

Consistent with disclosed embodiments, the communication system can be configured to ensure that the two headend nodes maintain a common view of the status of the communication network and of the demands on the communication network. Such a common view can include, in some embodiments, a mapping from each demand on the network to the headend responsible for the table; or a mapping from each demand on the network to a path on the network graph or route on the communication network. The disclosed embodiments are not limited to any particular data structure(s) for maintaining such a mapping. In some embodiments, the mapping can be maintained using a table.

In some embodiments, as described with regards to optional steps 401a and 401b, the headend nodes can be configured to obtain this common view from another component of the communication system, such as database 440 (e.g., database 170, or the like) or a network management system. In some embodiments, a change in network conditions can be recorded the database by a component of the communication system (e.g., a node or a network management system). In some embodiments, as described with regards to optional step 403, the headend nodes can be configured to maintain and synchronize their own databases. In some embodiments, both methods can be used. For example, a common database can store demand information (or a network graph describing available resources), while the headend nodes each maintain a synchronized network graph describing available resources (or a synchronized database of demand information).

In optional steps 401a and 401b of process 400, headends 410 and 420 can be configured to obtain a network representation from database 440, consistent with disclosed embodiments. In some embodiments, the network representation can include or specify a network graph representing the communication network. In some embodiments, the network representation can include or specify demands on the communication network. The demands can include a subset of demands managed by headend 410 and a subset of demands managed by headend 420.

In optional step 402 of process 400, headends 410 and 420 can be configured to synchronize network representations, consistent with disclosed embodiments. In some embodiments, each of headends 410 and 420 can be configured to exchange, send, or receive network information values describing the network representation maintained by that headend. In some embodiments, a protocol such as Resource Reservation Protocol (RSVP) or Resource Reservation Protocol—Traffic Engineering (RSVP-TE), Open Shortest Path First (OSPF), GMPLS Fast Failure Notification & Identification (GFFNI), or the like can be used to synchronize network representations between headend nodes.

In some embodiments, the communication system can be configured to create a spanning tree between all the headends. The disclosed embodiments are not limited to any particular method of creating such a spanning tree. In some embodiments, backup routes can be identified for the spanning tree. When a headend obtains a network information value (e.g., an indication of the addition, removal, or modification of a demand; or an indication of the addition or failure or a node or communication link), the headend can notify neighboring headends on the spanning tree. When a headend receives such an update, it can notify its neighbors on the spanning tree (excluding the originating neighbor).

In some embodiments, two neighboring headends on the spanning tree can synchronize their network representations. If the network representations differ (e.g., because a representation of the communication network maintained by the headend node is outdated, or the like), then the two headends can obtain confirmatory information. In some embodiments, the confirmatory information can be obtained from a network management system or common database. In various embodiments, the confirmatory information can be obtained from another headend. For example, when two headends differ regarding the status of a demand managed by a third headend, one or more of the two headends can provide an update request to the third headend. The third headend can respond to the update request by providing suitable network information (e.g., an indication of the demands managed by that headend, an indication of the statuses of the demands, or the like) to its neighbors on the spanning tree (who can in turn pass this network information on to their neighbors on the network tree).

Consistent with disclosed embodiments, two neighboring headends on the spanning tree can synchronize their network representations by comparing hashes of their databases. In some embodiments, the two neighboring headends can compare a hash of all the entries in the database. If these hashes match, then the synchronization process can terminate. Otherwise the two neighboring headends can perform a search, similar to a binary search, by comparing hashes of progressively smaller subsets of the database until the difference(s) between the databases are identified.

In steps 403a and 403b of process 400, headends 410 and 420 can receive trigger messages, consistent with disclosed embodiments. In some embodiments, the trigger messages can indicate a change in the communication network. The change in the communication network can be the addition, removal, or modification of a demand on the communication network. The change in the communication network can be the modification (e.g., the failure, capacity reduction, change in supported frequency slots, or the like) of a communication link or node in the communication network. The change in the communication network can be a change in the operability (e.g., failure, addition, or restoration or recovery from a prior failure) of a communication link or node in the communication network). The change in the communication network can be the addition of a valid communication link or node in the communication network. As may be appreciated, the headend can, in response to the indication, update the network graph corresponding to the communication network. The headend can add a valid edge or vertex in response to the addition of the valid communication link or node in the communication network. The headend can invalidate the edge or vertex corresponding to the modified or inoperable communication link or node (e.g., by indicating that the edge or vertex is invalid, but removing the edge or vertex from the network graph, or the like).

As depicted in FIG. 4, the trigger messages can be provided by another node in the communication system. For example, the node connected to a failed communication link (or to a failed node) could report the failure of the communication link (or node). In some embodiments, the trigger messages can be provided by another component of a communication system including the communication network (e.g., a network management system, such as network management system 150 of communication system 100).

In step 404a and 404b of process 400, headends 410 and 420 can determine paths for demands, consistent with disclosed embodiments. The demands can be those included or specified in the network representation obtained in steps 401a and 401b (or a subset of the demands affected by the change in network conditions). The paths can be determined according to rules or instructions such that both headends 410 and 420 identify the same paths in the same deterministic ordering. In some embodiments, the deterministic ordering can depend on the demands (e.g., the deterministic ordering can be inherited from a deterministic ordering of the demands). In some embodiments, the deterministic ordering can arise from the application of the rules or instructions to the network information (e.g., a first path for a first demand is added to a set of determined paths, according to the rules or instructions, then a second path for a second demand is added to the set of determined paths, according to the rules or instructions, etc.). The paths can be found using any suitable deterministic path-finding method. In some embodiments, the paths can be found using a deterministic Dijkstra method, a deterministic breadth-first search method, or a deterministic depth-first search method.

In this example, both headend nodes can determine that a path $p_x$ for satisfying $d_x$ should be implemented first, followed by a path $p_y$ for satisfying $d_y$. Accordingly, in step 406 of process 400, headend 420 can provide configuration instructions to nodes 430 to implement a route $r_x$ corresponding to path $p_x$, consistent with disclosed embodiments. In some embodiments, headend 420 can receive confirmation messages from relevant ones of nodes 430. The confirmation messages can indicate successful configuration of these nodes for implementing route $r_x$.

In optional step 407 of process 400, headend 420 can provide a configuration confirmation message, consistent with disclosed embodiments. The configuration confirmation message can be provided to headend 410 (as depicted in FIG. 4) or to another component of the communication system (e.g., a network management device). The configuration confirmation message can indicate successful configuration of the communication network to implement route $r_x$ for satisfying demand $d_x$. As may be appreciated, the resources required to satisfy demand $d_y$ may only become available once route $r_x$ is implemented (e.g., these resources may be currently used to implement the original route for demand $d_x$). Thus, in some embodiments, headend 410 can wait to receive the confirmation message from headend 420 before providing instructions to nodes 430 to implement a route $r_y$ for satisfying demand $d_y$.

In step 408 of process 400, headend 410 can provide configuration instructions to nodes 430 to implement a route $r_y$ corresponding to path $p_y$, consistent with disclosed embodiments. In some embodiments, headend 410 can delay provision of the configuration instructions until a completion condition is satisfied. The completion condition can be associated with demand $d_y$. In some embodiments, the completion condition can depend on the position of demand $d_y$ in the deterministic ordering of the demands. In some embodiments, the completion condition can be satisfied when all demands associated with earlier positions in the deterministic ordering are accounted for by headend 410. For example, given a deterministic ordering of paths $p_x$, $p_y$, and $p_z$ for demands $d_x$, $d_y$, and $d_z$, a headend (e.g., headend 410) can consider the completion condition for $p_z$ satisfied when demands $d_x$ and $d_y$ are satisfied.

Consistent with disclosed embodiments, a headend can account for a demand managed by that headend. In some embodiments, such a demand can be accounted for when the headend has configured the communications network to satisfy the demand. For example, headend 420 can determine that demand $d_x$ has been accounted for when headend 420 receives confirmation messages from relevant ones of nodes 430 indicating the successful confirmation of these nodes.

Consistent with disclosed embodiments, a first headend can account for a second demand managed by another, second headend. In some embodiments, the second demand can be accounted for when the first headend receives an indication that the communications network has been configured to satisfy the second demand. The indication can be one or more messages confirming configuration of the network. The messages can be received from the second headend, nodes implementing a route that satisfies the second demand, or another component of the communication system (e.g., a network management device). For example, in optional step 407, headend 410 can receive a configuration confirmation message from headend 420. Additionally or alternatively, in step 406, headend 410 can receive confirmation messages from the relevant ones of nodes 430.

As may be appreciated, in some instances a headend may not receive a configuration confirmation message from another headend, either intentionally or unintentionally (e.g., as the result of a failure of the other headend or a communication failure, such as a failure of the communication link(s) connecting the two headend nodes, or the like). Accordingly, to prevent the process from stalling, in various embodiments, the first headend can account for the second demand when a timing condition has been satisfied. The timing condition can specify a duration associated with the second path. As may be appreciated, a duration can be associated with the second path when the duration is directly associated with the second path, associated with the second demand, associated with a route satisfying the second demand, associated with a position of the second path in a deterministic ordering of paths, or the like. The timing condition can be satisfied when an elapsed time exceeds the specified duration. In this manner, once sufficient time has elapsed, a headend can deem the communication network to be configured to satisfy the demand managed by the other headend.

Consistent with disclosed embodiments, the elapsed time can be measured with reference to a starting time. In some embodiments, the starting time can be a time of receipt of the trigger messages (e.g., in steps 403*a* or 403*b*). For example, given a trigger message m and a deterministic ordering of paths $p_x$, $p_y$, and $p_z$ for demands $d_x$, $d_y$, and $d_z$, a headend (e.g., headend 410) can measure an elapsed duration for path $p_x$ with respect to a time of receipt of trigger message m. Once this time has elapsed, headend 410 can consider demand $d_y$ accounted for. In various embodiments, the starting time can be a time another demand was accounted for (e.g., once a duration associated with the other demand elapses, upon receipt of a configuration confirmation message concerning the other demand from another headend or a network management device, upon receipt of confirmation messages from relevant ones of the nodes 430, or the like). To continue the prior example, the headend can measure an elapsed duration for path $p_y$ with respect to a time demand $d_x$ was accounted for (e.g., upon expiration of a duration associated with demand $d_x$).

Consistent with disclosed embodiments, a headend can receive an indication that the communication network failed to implement a route. For example, headend 410 can receive an indication in step 408 (e.g., from relevant ones of nodes 430) of a conflict preventing implementation of path $p_x$ on the network. While the disclosed embodiments are intended to prevent or reduce such conflicts, incomplete synchronization of network information or other unanticipated problems may still result in a conflict. In response to the indication, the headend can implement a fall-back method. Under the fall-back method, the headend can immediately attempt to configure the communication network to implement routes for any remaining unrestored demands managed by that headend. The headend can address any conflicts by redetermining new paths using a path-finding method that differs from the deterministic path-finding method used to find the original paths. In some embodiments, the fall-back path-finding method can be a stochastic path-finding method.

Consistent with disclosed embodiments, a headend can determine that a timeout condition has been satisfied. In some embodiments, the timeout condition can be satisfied when a timer has expired. In some embodiments, upon expiration of the timer (or receiving a message indicating expiration of the timer), a node can revert to using the fall-back method. In some embodiments, the timer can be associated with the communication network as a whole, or the process as a whole. An initial value of the timer can depend on the communication network (e.g., projected OSPF convergence time for the communications network). In some embodiments, the timer can be associated with a particular demand. An initial value of the timer can depend on an assumed time required to configure a path and a number of paths preceding the demand in the deterministic ordering. In some embodiments, the initial value can further depend on a safety margin (e.g., an additional factor of 10 to 50%, or another suitable value).

In some embodiments, a network management system can manage the timer (e.g., starting the timer upon receipt of a message indicating a change in network conditions and broadcasting a suitable indication upon expiration of the timer). In various embodiments, each node can manage a copy of the timer.

Figure 5:
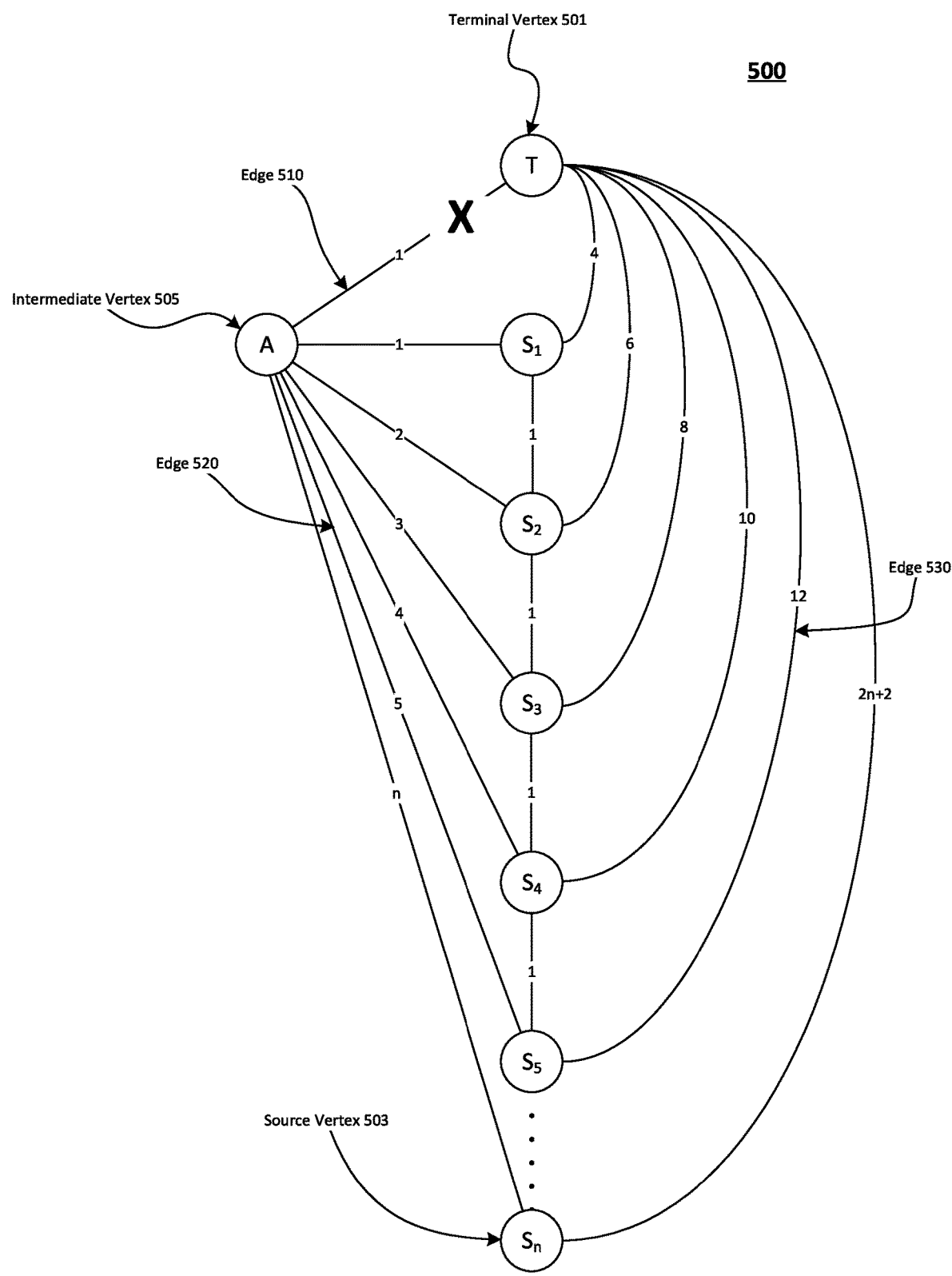
FIG. 5 depicts an exemplary network graph constructed to illustrate the improvements provided by the disclosed embodiments.

FIG. 5 depicts an exemplary network graph 500 constructed to illustrate the improvements provided by the disclosed embodiments. Network graph 500 includes a terminal vertex (e.g., terminal vertex 501), source vertices (e.g., source vertex $S_n$), an intermediate vertex (e.g., intermediate vertex 505) and edges (e.g., edges 510, 520, and 530). The demands on network graph 500 can be $d_1$, $d_2$, $d_3$, $d_4$, $d_5$, . . . , and $d_n$. Each demand can have terminal vertex T as one endpoint and one of source vertices $S_1$, $S_2$, $S_3$, $S_4$, $S_5$, . . . , and $S_n$ respectively, as the other endpoint. The vertices $S_1$, $S_2$, $S_3$, $S_4$, $S_5$, . . . , and $S_n$ can serve as the headends for demands $d_1$, $d_2$, $d_3$, $d_4$, $d_5$, . . . , and $d_n$, respectively. Each of demands $d_1$, $d_2$, $d_3$, $d_4$, $d_5$, . . . , and $d_n$ has a volume of 1. Each of demands $d_1$, $d_2$, $d_3$, $d_4$, $d_5$, . . . , and $d_n$ has a corresponding path $p_1$, $p_2$, $p_3$, $p_4$, $p_5$, . . . , and $p_n$. Each of these paths connects the terminal vertex with the respective source vertex through an intermediate vertex (e.g., intermediate vertex 505). Edge $e_{AT}$ has a capacity of n. Edge $e_{S_i S_{i+1}}$ has a capacity of n−i. The remaining edges have a capacity of 1. Each edge has a score, as listed on the edge. For example, the score of edge $e_{TS_{is}}$ is 10 and the score of edge $e_{AS_4}$ is 1. The headends can be configured to determine paths that minimize the total score of the edges included in the paths.

As depicted in FIG. 5, edge 510 can fail. The headends must now determine restoration paths for the demands. In accordance with some conventional approaches, each headend may independently determine a restoration path for the demand managed by that headend. As may be appreciated, given the edge scores, these restoration paths will all use edge $e_{TS_1}$. However, the capacity of edge $e_{TS_1}$ is 1. Accordingly, a single headend will successfully reserve this edge. The remaining headends will then attempt to implement restoration paths using edge $e_{TS_2}$. However, the capacity of edge $e_{TS_1}$ is 1. Accordingly, a single headend will successfully reserve this edge. Eventually, restoration routes will be established that use each of edges $e_{TS_i}$, for i=1 to n. But, as may be appreciated, this process may involve many conflicts.

In contrast, route determination consistent with disclosed embodiments can result in the assignment of restoration routes without conflicts. In a first phase, each headend can determine paths for each of the demands. For example, each headend may determine that demand $d_i$ is satisfied by corresponding path $p_i$ from $S_1$ to T along edge $e_{TS_i}$. These paths can be identified deterministically and can be associated with a deterministic ordering. In a second phase, each headend can provide instructions to configure the network to satisfy the demands it manages, in accordance with the deterministic ordering. Accordingly, there would be no conflicts.

Figure 6:
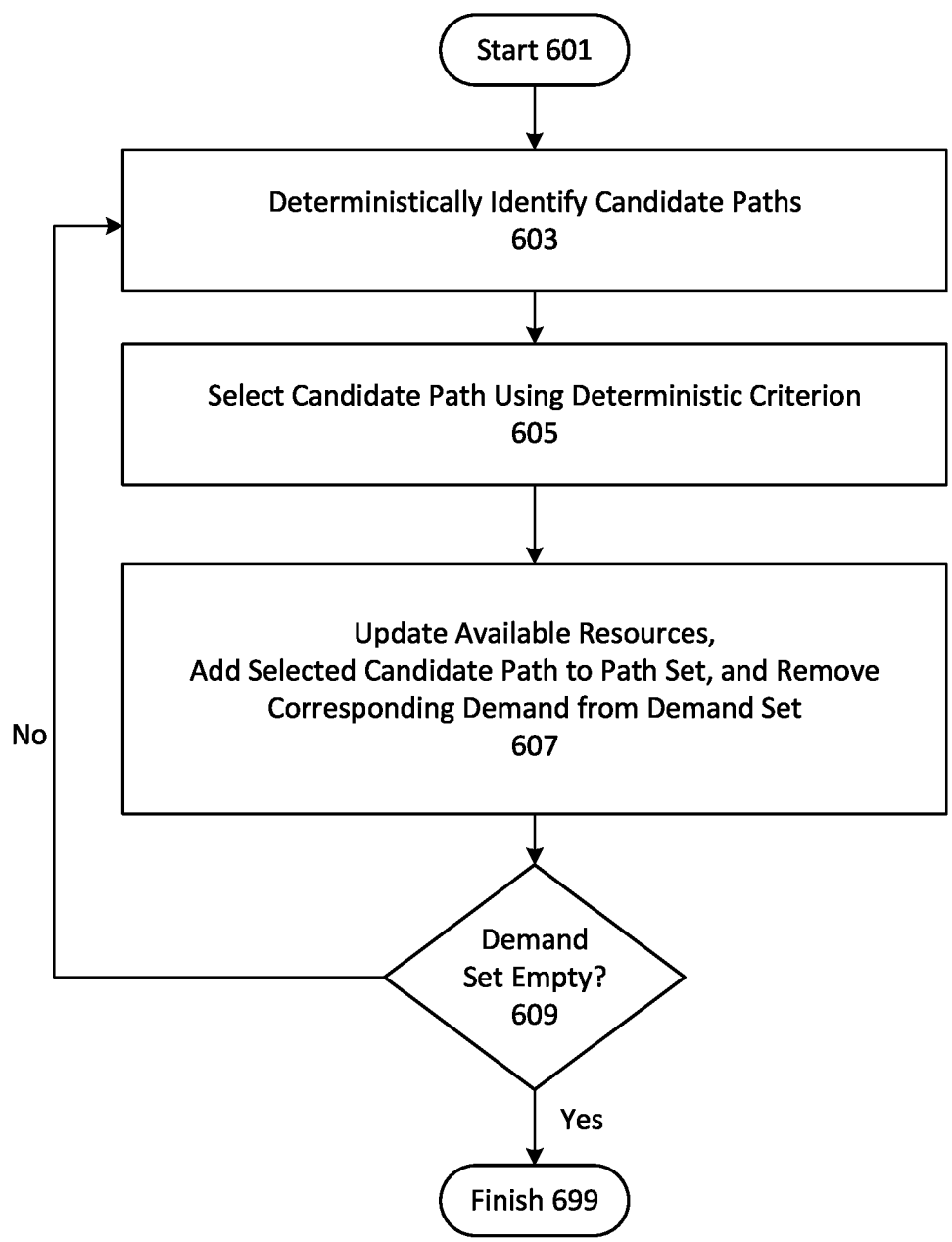
FIG. 6 depicts an exemplary process for deterministically identifying paths for a set of demands, consistent with disclosed embodiments.

FIG. 6 depicts an exemplary process 600 for deterministically identifying paths for a set of demands, consistent with disclosed embodiments. In some embodiments, process 600 can be performed by a headend. The headend can perform process 600 as part of another process or as a stand-alone process. For example, each of multiple headends can perform process 600 as part of steps 404a or 404b of process 400. As described herein, each headend can perform process 600 such that the same paths are identified in the same order.

In step 601, process 600 can begin. Consistent with disclosed embodiments, the headend can obtain network information for performing process 600. In some embodiments, the headend can obtain the network information from a database (e.g., database 170) or at least one other headend (e.g., through a synchronization process). The network information can include a network graph and a set of demands. In some embodiments, the network graph can include only valid or operational nodes and edges. In various embodiments, the network graph can indicate which nodes and edges are valid or operational. In some embodiments, a path set can be initialized to the null set and a demand set can be initialized to the set of demands.

In step 603 of process 600, the headend can deterministically identify candidate paths for demands in the demand set, consistent with disclosed embodiments. As may be appreciated, conventional path-finding algorithms can include a stochastic component. For example, when given multiple equivalent options (e.g., multiple candidate vertices or edges for constructing a path, or the like), a conventional path-finding algorithm may randomly select one of the options. Consistent with disclosed embodiments, the stochastic component can be replaced with a deterministic component. In some embodiments, the edges and/or vertices in the network graph can be associated with a relation order that maps the edges and/or vertices to an ordered list. As a straightforward, non-limiting example, different identification numbers can be associated with each edge or vertex in the network. When creating a path, the headend can select among equivalent edges, or equivalent vertices, based on these identification numbers (e.g., by selecting the edge or vertex having the lowest identification number). As may be appreciated, when determining a path for a demand, the headend can use available resources (e.g., resources not used by other paths) and resources currently used by any current path for the demand.

In step 605 of process 600, the headend can deterministically select among the candidate paths identified in step 603, consistent with disclosed embodiments. In some embodiments, the headend can be configured to select among equivalent paths using a relation order that maps the paths to an ordered list. The relation order can depend, at least in part, on a lowest value of a metric (e.g., Optical Signal to Noise Ratio, physical path length, number of edges, or the like) for the path. As an additional example, when edges or vertices are associated with scores, the relation order can depend, at least in part, on a total score value of the candidate paths. As a further example, the relation order can depend, at least in part, on a number of demands affected by the selection of the path (e.g., the number of other paths corresponding to other demands that are rendered invalid by the selection of this candidate path). However, multiple candidate paths may remain equivalent under these approaches. The headend can be configured to select among such equivalent paths using some additional criteria, such as an identification number. For example, when selecting among equivalent paths, the headend can select the path including the edge or vertex having the lowest (or highest, etc.) identification number (or the next lowest identification number, if both paths include the same lowest-identification-number edge or vertex, etc.).

In step 607 of process 600, the headend can add the selected candidate path to the path set, update the demand set to remove the demand associated with the selected candidate path, and update the available resources on the network graph, consistent with disclosed embodiments. The available resources can be updated to reflect the resources used by the candidate path (and any resourced used by the prior path and unused by the candidate path). For example, an edge included in the selected candidate path can be removed from the network graph. As an additional example, the capacity of an edge included in the selected candidate path can be decreased by the volume of the demand satisfied by the candidate path. As an additional example, the set of available frequency slots associated with an edge can be updated to remove the frequency slot used by the selected candidate path (and any other frequency slots that overlap or otherwise conflict with the frequency slot used by the selected candidate path). As a further example, an edge included in a previous route for satisfying the demand, but not included in the selected candidate path, can be added to the network graph, or a capacity of such an edge can be increased by the volume of the demand, or any frequency slots used in the previous route but unused in the selected candidate route can be marked available.

In step 609 of process 600, the headend can determine whether the demand set is empty. For example, the demand set can be empty when the headend has selected candidate paths satisfying each demand in the set of demands obtained in step 601. When the demand set is empty, process 600 can proceed to step 699. When the demand set is not empty, process 600 can return to step 603.

Consistent with disclosed embodiments, upon returning to step 603, the headend can deterministically identify candidate paths for demands in the updated demand set, consistent with disclosed embodiments. In some embodiments, the headend can deterministically identify candidate paths for all the demands in the updated demand set. In some embodiments, the headend can deterministically identify candidate paths for a subset of demands in the updated demand set. The headend can determine whether any existing candidate paths are invalid, given the updated resources of the communication network. For example, updating the available resources in step 607 may include removing edges included in the selected candidate path from the network graph, rendering other candidate paths invalid. The headend can also determine whether any demand lacks a valid candidate path. For example, a first demand may have two candidate paths (a valid candidate path and an invalid candidate path) and a second demand may have one invalid candidate path. The headend can determine that the second demand (but not the first demand) lacks a valid candidate path. The headend can then redetermine candidate path(s) for the demands that lack valid candidate paths, using the updated available resources.

In step 699 process 600 can terminate. When process 600 is part of another process, such as process 400, the path set generated by process 600 can be used in that other process. In some embodiments, the order in which paths are added to the path set in process 600 can specify the deterministic ordering according to which configuration instructions are provided in process 400. As may be appreciated, the $n_{i+1}$ demand added to the path set may depend on resources released by the re-routing of the $n_i$ demand.

In some embodiments, the deterministic ordering can be independent of the order in which paths are added to the path set in process 600. For example, identification numbers can be associated with the demands, and the deterministic ordering can depend on the identification numbers (e.g., lowest to highest, or another other suitable deterministic ordering).

While process 600 has been described with respect to sets of multiple demands, the disclosed embodiments are not so limited. In some embodiments, a deterministic ordering can be specified for the demands. A version of process 600 can then be performed in which candidate path(s) are determined for a single demand, according to the deterministic ordering of demands. One of these candidate path(s) can be deterministically selected. The available resources can be updated based on the selected candidate path. The path set can be updated to include the selected candidate path. The process can then be repeated, using the next demand in the deterministic ordering of demands, until a path has been determined for all demands in the set of demands.

Figure 7:
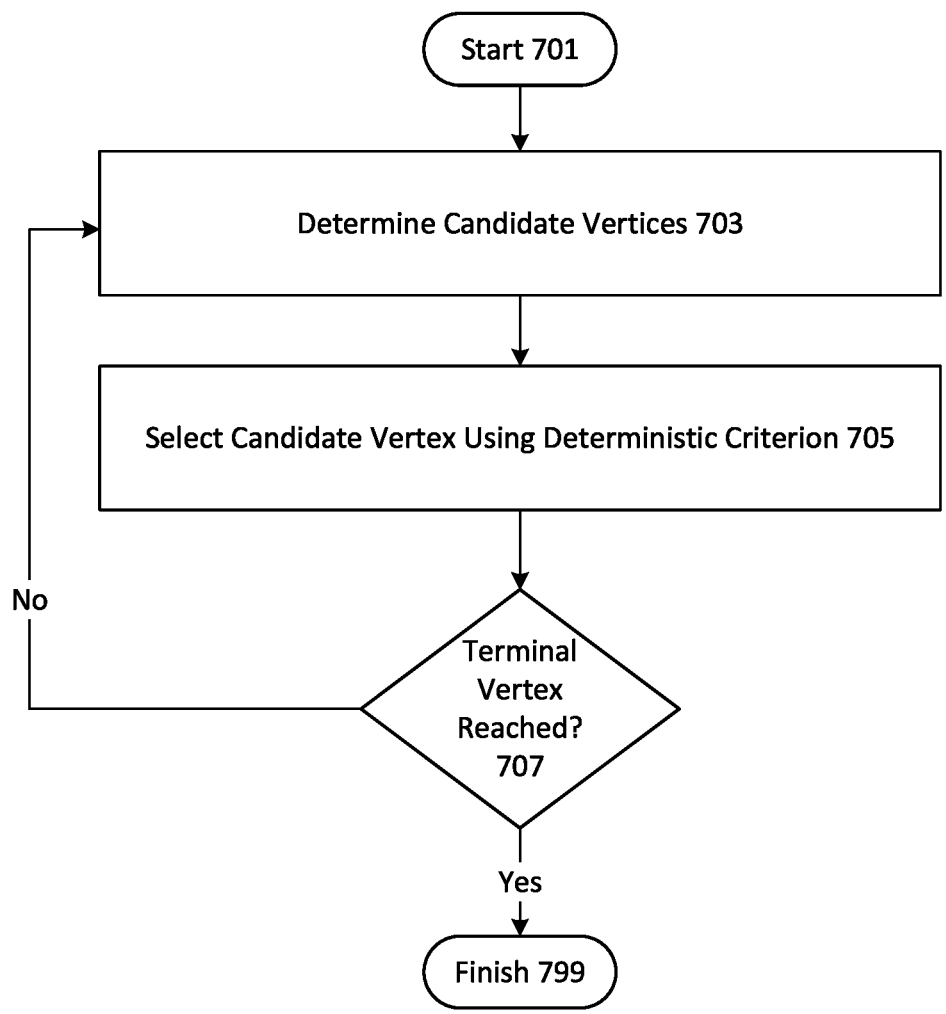
FIG. 7 depicts a process for deterministically identifying a candidate path, consistent with disclosed embodiments.

FIG. 7 depicts a process 700 for deterministically identifying a candidate path, consistent with disclosed embodiments. In some embodiments, process 700 can be performed by a headend. The headend can perform process 700 as part of another process or as a stand-alone process. For example, the headend can perform process 700 as part of step 603 of process 600. In turn, the headend can be one of multiple headends performing process 600 as part of steps 404a or 404b of process 400. As described herein, each headend can perform process 700 such that the candidate paths are identified in the same order.

Process 700 is described in the context of a path-finding algorithm in which the stochastic portion of the algorithm concerns the selection of a vertex connected to a current vertex. Examples of such algorithms include Dijkstra's algorithm, depth-first search algorithms, and breadth-first search algorithms. As may be appreciated, the disclosed embodiments could additionally or alternatively use other deterministic path-finding algorithms. When the headend is one of multiple headends performing process 600 as part of steps 404a or 404b of process 400, each of the multiple headends can be using the same deterministic path-finding algorithm.

In step 701, process 700 can begin. The headend can obtain a network graph and a demand. The demand can specify a source vertex and a terminal vertex.

In step 703 of process 700, the headend can determine a set of candidate vertices, consistent with disclosed embodiments. The criteria for selecting the next candidate vertices can depend on the path-finding method. For example, Dijkstra's algorithm can include a step of selecting an unvisited vertex as the current vertex, then assigning or updating a score of all unvisited vertices connected by an edge to the current vertex. The current vertex can then be removed from the set of unvisited vertices and a new current vertex can be selected. The new current vertex can be selected from among the unvisited vertices having a lowest score. In this instance, the set of candidate vertices would be the unvisited vertices having the lowest score. As an additional example, a breath-first search may visit every vertex connected to the source vertex by a number of edges. The set of candidate vertices would be the unvisited vertices connected to the source vertex by the number of edges. As an additional example, a depth-first search may visit one of the vertices connected by an edge to a current vertex. The set of candidate vertices would be the unvisited vertices connected by an edge to the current vertex.

In step 705 of process 700, the headend can select among the candidate vertices using a deterministic criterion, consistent with disclosed embodiments. In some embodiments, the headend can apply a relation order to the candidate vertices. The relation order can map the candidate vertices to an ordered list. The headend can select among the candidate vertices based on their order in the ordered list (e.g., the first, the last, etc.). In some embodiments, an identification number can be associated with the candidate vertices. The headend can select among the candidate vertices based on identification number. For example, if the vertices 101, 32, 64, 13, and 80 are in this list, and the headend is configured to select the vertex with the highest identification number, then the headend will select vertex 101. If the headend is configured to select the vertex with the lowest identification number, then the headend will select vertex 13.

In step 707 of process 700, the headend can determine whether the terminal vertex has been reached, consistent with disclosed embodiments. In some embodiments, depending on the path-finding algorithm, a path has been found from the source vertex to the terminal vertex when the selected candidate vertex is the terminal vertex. Process 700 can then proceed to step 799. Otherwise, process 700 can return to step 703.

Consistent with disclosed embodiments, process 700 can also terminate in response to a determination that the terminal vertex cannot be reached from the source vertex. For example, when the set of candidate vertices is the null set.

In step 799, process 700 can terminate. As may be appreciated, upon termination of process 700, the headend can return a path from the source vertex to the terminal vertex. Alternatively, the headend can return an indication that such a path does not exist. When process 700 is included in another process, the identified path can be used by subsequent steps in that other process. For example, the headend can perform process 700 as part of determining candidate paths for demands in step 603 of process 600. The path identified using process 700 can then be one of the determined candidate paths.

The disclosed embodiments may further be described using the following clauses:

1. A headend node, comprising: at least one processor; and at least one computer readable medium containing instructions that, when executed by the at least one processor, cause the headend node to perform operations comprising: obtaining network information for a communication network, the network information specifying: a network graph representing the communication network; and demands on the communication network, the demands including a first subset of the demands managed by the headend node and a second subset of the demands managed by other headend nodes; and in response to satisfaction of a trigger condition: determining paths on the network graph using a deterministic path-finding method, the determined paths corresponding to the demands and having a deterministic ordering; and configuring the communication network to satisfy the first subset of the demands, the configuring comprising: providing configuration instructions to configure the communication network to satisfy a first demand of the first subset using a first route, the first route implementing a first path of the determined paths, the first path corresponding to the first demand; and wherein the provision of the configuration instructions is delayed until a completion condition based on the deterministic ordering is satisfied.

2. The headend node of clause 1, wherein: the first path occupies a first position in the deterministic ordering; and the completion condition is satisfied when all paths occupying positions in the deterministic ordering earlier than the first position are accounted for by the headend node.

3. The headend node of clause 2, wherein: a second path occupying a second position in the deterministic ordering, the second position being earlier in the deterministic ordering than the first position, is accounted for by the headend node: when the second path corresponds to a second demand of the first subset and the headend node has configured the communication network to satisfy the second demand using a second route that implements the second path; or when the second path corresponds to a third demand in the second subset and the headend node has received an indication that the communication network has been configured to satisfy the third demand.

4. The headend node of clause 2, wherein: a second path occupying a second position in the deterministic ordering, the second position being earlier in the deterministic ordering than the first position, is accounted for by the headend node: based on an elapsed time.

5. The headend node of any one of clauses 1 to 4, wherein: the configuring further comprises: receiving an indication that the communication network failed to implement the first route; and in response to the indication: determining a fallback path on the network graph using a path-finding method differing from the deterministic path-finding method; and providing second configuration instructions to configure the communication network to satisfy the first demand using a fallback route, the fallback route implementing the fallback path.

6. The headend node of any one of clauses 1 to 5, wherein: the deterministic path-finding method comprises a deterministic Dijkstra method, a deterministic breadth-first search method, or a deterministic depth-first search method.

7. The headend node of any one of clauses 1 to 6, wherein: obtaining the network information comprises obtaining the network information from at least one of: a database accessible to multiple headend nodes of the communication network; or another headend node of the communication network.

8. The headend node of any one of clauses 1 to 7, wherein: the operations further comprise: receiving network information values from at least one of the database or the other headend node; and determining, based on the received network information values, that a representation of the communication network maintained by the headend node is outdated; and the network information is obtained in response to the determination that the representation is outdated.

9. The headend node of any one of clauses 1 to 8, wherein: obtaining the network information comprises retrieving, from another headend node of the communication network, an indication of demands managed by that headend; and the operations further comprise providing, to the other headend node of the communication network, an indication of the first demand.

10. The headend node of any one of clauses 1 to 9, wherein: the trigger condition is satisfied by receipt of a message indicating addition or removal of a demand on the communication network; or the trigger condition is satisfied by receipt of a message indicating the modification of a communication link or node in the communication network, the modification: adding at least one valid edge or vertex in the network graph, or rendering invalid at least one of an edge in the network graph or a vertex in the network graph; and the determination of the determined paths on the network graph is limited to valid edges and vertices of the network graph.

11. A communication system, comprising: nodes connected by communication links, the nodes including headend nodes responsible for managing demands on a communication network, each headend node configured to perform, in response to satisfaction of a trigger condition, operations including: determining paths on the network graph using a deterministic path-finding method, the determined paths corresponding to the demands and having a deterministic ordering, the demands including a first subset of demands managed by the headend and a second subset of demands managed by other headend nodes; providing configuration instructions to configure the communication network to satisfy the first subset of demands using routes that implement a corresponding subset of the determined paths; and wherein the provision of the configuration instructions to configure the communication network to satisfy a first demand in the first subset is delayed until a completion condition associated with the first demand in the first subset is satisfied.

12. The communication system of clause 11, wherein: the first demand in the first subset is associated with a first position in the deterministic ordering; and the completion condition is satisfied when all demands associated with earlier positions in the deterministic ordering are accounted for by the headend node.

13. The communication system of clause 12, wherein: a demand is accounted for by the headend node: when the headend node has configured the communication network to satisfy the demand; or when the headend node has received an indication that the communication network has been configured to satisfy the demand.

14. The communication system of clause 12, wherein: a demand is accounted for by the headend node when an elapsed time exceeds a duration associated with the demand.

15. The communication system of any one of clauses 11 to 14, wherein: the operations further comprise: receiving an indication that configuration of the communication network to satisfy the first demand failed; in response to the indication: determining a fallback path using a path-finding method differing from the deterministic path-finding method; and providing second configuration instructions to configure the communication network to satisfy the first demand using a fallback route, the fallback route implementing the fallback path.

16. The communication system of any one of clauses 11 to 15, wherein: the deterministic path-finding method comprises a deterministic Dijkstra method, a deterministic breadth-first search method, or a deterministic depth-first search method.

17. The communication system of any one of clauses 11 to 16, wherein: the operations further comprise obtaining network information from at least one of: a database accessible to multiple headend nodes of the communication network; or another headend node of the communication network; and the paths are determined for all the demands using, in part, the obtained network information.

18. The communication system of any one of clauses 11 to 17, wherein: the operations further comprise: receiving network information values from the at least one of the database or the other headend node; and determining, based on the received network information values, that a representation of the communication network maintained by the headend node is outdated; and the network information is obtained in response to the determination that the representation is outdated.

19. The communication system of any one of clauses 11 to 18, wherein: the operations further comprise: providing an indication of demands managed by the headend node to another headend node; and retrieving an indication of demands managed by the other headend node from the other headend node.

20. The communication system of any one of clauses 11 to 19, wherein: the trigger condition is satisfied by receipt of a message indicating addition or removal of a demand on the communication network; or the trigger condition is satisfied by receipt of a message indicating the modification of a communication link or node in the communication network, the modification: adding at least one valid edge or vertex in the network graph, or rendering invalid at least one of an edge in the network graph or a vertex in the network graph; and the determination of the determined paths on the network graph is limited to valid edges and vertices of the network graph.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A headend node, comprising:
   at least one processor; and
   at least one computer readable medium containing instructions that, when executed by the at least one processor, cause the headend node to perform operations comprising:
      obtaining network information for a communication network, the network information specifying:
         a network graph representing the communication network; and
         demands on the communication network, the demands including a first subset of the demands managed by the headend node and a second subset of the demands managed by other headend nodes; and
      in response to satisfaction of a trigger condition:
         determining paths on the network graph using a deterministic path-finding method, the determined paths corresponding to the demands and having a deterministic ordering; and
         configuring the communication network to satisfy the first subset of the demands, the configuring comprising:
            providing configuration instructions to configure the communication network to satisfy a first demand of the first subset using a first route, the first route implementing a first path of the determined paths, the first path corresponding to the first demand; and
            wherein the provision of the configuration instructions is delayed until a completion condition based on the deterministic ordering is satisfied.

2. The headend node of claim 1, wherein:
   the first path occupies a first position in the deterministic ordering; and
   the completion condition is satisfied when all paths occupying positions in the deterministic ordering earlier than the first position are accounted for by the headend node.

3. The headend node of claim 2, wherein:
a second path occupying a second position in the deterministic ordering, the second position being earlier in the deterministic ordering than the first position, is accounted for by the headend node:
  when the second path corresponds to a second demand of the first subset and the headend node has configured the communication network to satisfy the second demand using a second route that implements the second path; or
  when the second path corresponds to a third demand in the second subset and the headend node has received an indication that the communication network has been configured to satisfy the third demand.

4. The headend node of claim 2, wherein:
a second path occupying a second position in the deterministic ordering, the second position being earlier in the deterministic ordering than the first position, is accounted for by the headend node:
based on an elapsed time.

5. The headend node of claim 1, wherein:
the configuring further comprises:
  receiving an indication that the communication network failed to implement the first route; and
  in response to the indication:
    determining a fallback path on the network graph using a path-finding method differing from the deterministic path-finding method; and
    providing second configuration instructions to configure the communication network to satisfy the first demand using a fallback route,
the fallback route implementing the fallback path.

6. The headend node of claim 1, wherein:
the deterministic path-finding method comprises a deterministic Dijkstra method, a deterministic breadth-first search method, or a deterministic depth-first search method.

7. The headend node of claim 1, wherein:
obtaining the network information comprises obtaining the network information from at least one of:
  a database accessible to multiple headend nodes of the communication network; or
  another headend node of the communication network.

8. The headend node of claim 7, wherein:
the operations further comprise:
  receiving network information values from at least one of the database or the other headend node; and
  determining, based on the received network information values, that a representation of the communication network maintained by the headend node is outdated; and
the network information is obtained in response to the determination that the representation is outdated.

9. The headend node of claim 1, wherein:
obtaining the network information comprises retrieving, from another headend node of the communication network, an indication of demands managed by that headend; and
the operations further comprise providing, to the other headend node of the communication network, an indication of the first demand.

10. The headend node of claim 1, wherein:
the trigger condition is satisfied by receipt of a message indicating addition or removal of a demand on the communication network; or
the trigger condition is satisfied by receipt of a message indicating modification of a communication link or node in the communication network, the modification:
  adding at least one valid edge or vertex in the network graph, or
  rendering invalid at least one of an edge in the network graph or a vertex in the network graph; and
the determination of the determined paths on the network graph is limited to valid edges and vertices of the network graph.

11. A communication system, comprising:
nodes connected by communication links, the nodes including headend nodes responsible for managing demands on a communication network, each headend node configured to perform, in response to satisfaction of a trigger condition, operations including:
  determining paths on a network graph using a deterministic path-finding method,
    the determined paths corresponding to the demands and having a deterministic ordering, the demands including a first subset of demands managed by the headend node and a second subset of demands managed by other headend nodes;
  providing configuration instructions to configure the communication network to satisfy the first subset of demands using routes that implement a corresponding subset of the determined paths; and
  wherein the provision of the configuration instructions to configure the communication network to satisfy a first demand in the first subset is delayed until a completion condition associated with the first demand in the first subset is satisfied.

12. The communication system of claim 11, wherein:
the first demand in the first subset is associated with a first position in the deterministic ordering; and
the completion condition is satisfied when all demands associated with earlier positions in the deterministic ordering are accounted for by the headend node.

13. The communication system of claim 12, wherein:
a demand is accounted for by the headend node:
  when the headend node has configured the communication network to satisfy the demand; or
  when the headend node has received an indication that the communication network has been configured to satisfy the demand.

14. The communication system of claim 12, wherein:
a demand is accounted for by the headend node when an elapsed time exceeds a duration associated with the demand.

15. The communication system of claim 11, wherein:
the operations further comprise:
  receiving an indication that configuration of the communication network to satisfy the first demand failed;
  in response to the indication:
    determining a fallback path using a path-finding method differing from the deterministic path-finding method; and
    providing second configuration instructions to configure the communication network to satisfy the first demand using a fallback route,
    the fallback route implementing the fallback path.

16. The communication system of claim 11, wherein:
the deterministic path-finding method comprises a deterministic Dijkstra method, a deterministic breadth-first search method, or a deterministic depth-first search method.

17. The communication system of claim 11, wherein:

the operations further comprise obtaining network information from at least one of:

a database accessible to multiple headend nodes of the communication network; or another headend node of the communication network; and the paths are determined for all the demands using, in part, the obtained network information.

18. The communication system of claim 17, wherein:

the operations further comprise:

receiving network information values from the at least one of the database or the other headend node; and determining, based on the received network information values, that a representation of the communication network maintained by the headend node is outdated; and the network information is obtained in response to the determination that the representation is outdated.

19. The communication system of claim 11, wherein:

the operations further comprise:

providing an indication of demands managed by the headend node to another headend node; and retrieving an indication of demands managed by the other headend node from the other headend node.

20. The communication system of claim 11, wherein:

the trigger condition is satisfied by receipt of a message indicating addition or removal of a demand on the communication network; or the trigger condition is satisfied by receipt of a message indicating modification of a communication link or node in the communication network, the modification:

adding at least one valid edge or vertex in the network graph, or rendering invalid at least one of an edge in the network graph or a vertex in the network graph; and the determination of the determined paths on the network graph is limited to valid edges and vertices of the network graph.

\* \* \* \* \*